United States Patent [19]
Griffin

[11] Patent Number: 5,666,402
[45] Date of Patent: Sep. 9, 1997

[54] FIBER OPTIC TELEPHONE LINE EXTENSION SYSTEM

[75] Inventor: G. Scott Griffin, Annapolis, Md.

[73] Assignee: Electro-Metrics, Inc., Johnstown, N.Y.

[21] Appl. No.: 222,806

[22] Filed: Apr. 5, 1994

[51] Int. Cl.$^6$ .................................................. H04M 11/00
[52] U.S. Cl. ........................................ 379/56.2; 379/93.28
[58] Field of Search ............................... 379/93, 379, 98; 375/222; 359/154, 180, 109, 118, 173, 152, 151, 179, 163; 370/3.4, 95.1, 94.1; 395/200; 358/133

[56] References Cited

U.S. PATENT DOCUMENTS

| H850 | 11/1990 | Feldman | 359/151 |
|---|---|---|---|
| 1,981,999 | 8/1934 | French . | |
| 4,052,611 | 10/1977 | Fish | 250/199 |
| 4,330,869 | 5/1982 | Robieux | 455/607 |
| 4,528,695 | 7/1985 | Khoe | 359/173 |
| 4,545,075 | 10/1985 | Miller et al. | 359/173 |
| 4,596,051 | 6/1986 | Feldman | 359/173 |
| 4,679,115 | 7/1987 | Connan et al. | 379/379 |
| 4,805,234 | 2/1989 | Husbands | 359/173 |
| 4,817,204 | 3/1989 | Jannelli et al. | 358/118 |
| 5,063,595 | 11/1991 | Ballance | 380/48 |
| 5,369,517 | 11/1994 | Takasaki | 359/161 |

*Primary Examiner*—Stella Woo
*Attorney, Agent, or Firm*—Heslin & Rothenberg, P.C.

[57] ABSTRACT

Apparatus for providing telephone communication between a communication network and a remote station employs base and remote modems and a fiber optic communication link connecting the modems. The apparatus operates transparently to the communication network and user instruments at the remote site. Each modem includes audio signal processing equipment. The base modem employs an interface for emulating a user instrument to the network, and the remote modem employs an interface for emulating a network to a user instrument. The remote modem directly connects to a user instrument at the remote site.

37 Claims, 5 Drawing Sheets fig. 2

FIBER OPTIC TELEPHONE LINE EXTENSION SYSTEM

TECHNICAL FIELD

This invention relates to telephone communication and more specifically to the extension of telephone communication lines with the use of fiber optics.

BACKGROUND OF THE INVENTION

The use of telephones for communication is well known. Telephone communication is conventionally accomplished with communication networks that provide point-to-point audio communication between users connected to the network. A network includes equipment for switching incoming audio signals to outgoing audio signals based on pre-defined protocols and numbering systems. The sophistication of the network itself can range from simple, point-to-point links, to vast networks connecting millions of users by undersea cables, satellites or radio frequency transmission.

Although networks are becoming increasingly complex, improvements in the connection between a user instrument and the network are conspicuously absent. Paired copper cables have been employed for many years as the primary connection means between network, an RJ-11 wall jack in many cases, and the instrument itself. The transmission distance supported by copper cable is limited, as is its immunity to electromagnetic noise. The security of copper cable is also weak; mere exposure of the copper medium to a high-impedance signal monitor can defeat the privacy of a communication.

Certain applications of telephone communication require more than one instrument at a location, or the simultaneous communication of digital data. Current paired cable installations can only support a single, duplex communication link. Additional cables are necessary to support additional instruments or devices.

Cordless and cellular telephones have been introduced as alternate communication systems between user instruments and the network. Though effective in their use of radio frequency transmissions to free users from cable connections, the distance over which such links operate are limited. Such transmissions are also extremely susceptible to noise and are less secure than their cable counterparts because of their omni-directional, free-space transmissions.

An example of a current system requiring features not available with the aforementioned transmission media is the INMARSAT satellite transceiver system. The communication network, as implemented in this system, includes ground-based transceivers with antennas for communicating via the satellite link. The actual user instruments, however, are conventional telephone handsets, and are connected to the ground-based transceiver using standard paired copper cabling. Two telephone instruments near an operator are required, as is a third device for communicating digital control information to the transceiver. The distance between the transceiver and the remote site where operators are located is currently limited to 500 feet. The extension of this distance between the three mixed analog/digital communication devices and the transceiver beyond 500 feet is desirable, as is noise free, secure, single medium communication.

A need therefore exists for a communication medium which is capable of extending the distance between a conventional telephone instrument and its connection to a conventional communication network. The medium must accommodate mixed modes of communication (analog/digital) on multiple independent channels. Further, the medium must be secure, immune from noise, easily installed and must operate transparently to existing networks and instruments.

SUMMARY OF THE INVENTION

The aforementioned capabilities are provided in accordance with the present invention. Disclosed and claimed herein is an apparatus for providing telephone communication between a communication network and a remote station comprising a base modem for connection to a communication network, a remote modem for direct connection to a user instrument at the remote station, and a fiber optic link connecting the base and remote modems. The apparatus operates transparently to existing communication networks and instruments and, in one embodiment, can extend the distance between the network and a remote site to 2.5 kilometers.

The base modem provides a two-way communication path between the network and the fiber optic link and includes a network interface for communicating to the network and for emulating a user instrument to the network, a fiber optic controller and driver for transmitting and receiving modulated signals over the fiber optic link, and an audio processor for modulating network audio signals and demodulating modulated signals received from the remote site via the fiber optic link.

The remote modem provides a two-way communication path between a user instrument and the fiber optic link and includes a telephone interface for communicating to the user instrument and for emulating a network to the instrument, a fiber optic controller and driver for transmitting and receiving modulated signals over the fiber optic link, and an audio processor for modulating user audio signals and demodulating modulated signals received from the network via the fiber optic link.

A single strand fiber optic cable is employed for the full-duplex communication link which offers the extended distance, security and noise immunity required from the apparatus. Further, in one aspect, three virtual communication paths are provided over the cable, two for user instruments and another for digital data transmission. Multiple user devices are therefore supported by a single medium.

In another aspect, digital communication across the fiber optic link is employed, and audio signals from the network or user are converted to digital data with continuously variable slope delta modulation.

The apparatus operates transparently to the networks and instruments and no modification of existing equipment or operating procedures is required.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of a preferred embodiment and the accompanying drawings in which:

FIG. 2 is a schematic representation of a base modem in accordance with the present invention.

DETAILED DESCRIPTION

As set forth above, conventional telephone systems include a communication network and user instruments at each user location for communication between users at various locations. The inventive apparatus described herein allows a user to maintain instruments at further distances from interfaces to the communication network than were previously possible. This distance extension is accomplished using a fiber optic communication link as shown in FIG. 1.

Communication networks vary in size and complexity, and include the large, standard AT&T telephone system in use throughout North America, or smaller, more specialized communication networks, such as satellite transceivers which provide access to large networks to specific users. A specific implementation of such a transceiver in use is the INMARSAT terminal. The interfaces to either type of communication network are similar, and usually consist of the same user instruments, connected by paired copper cable to the network.

Figure 1:
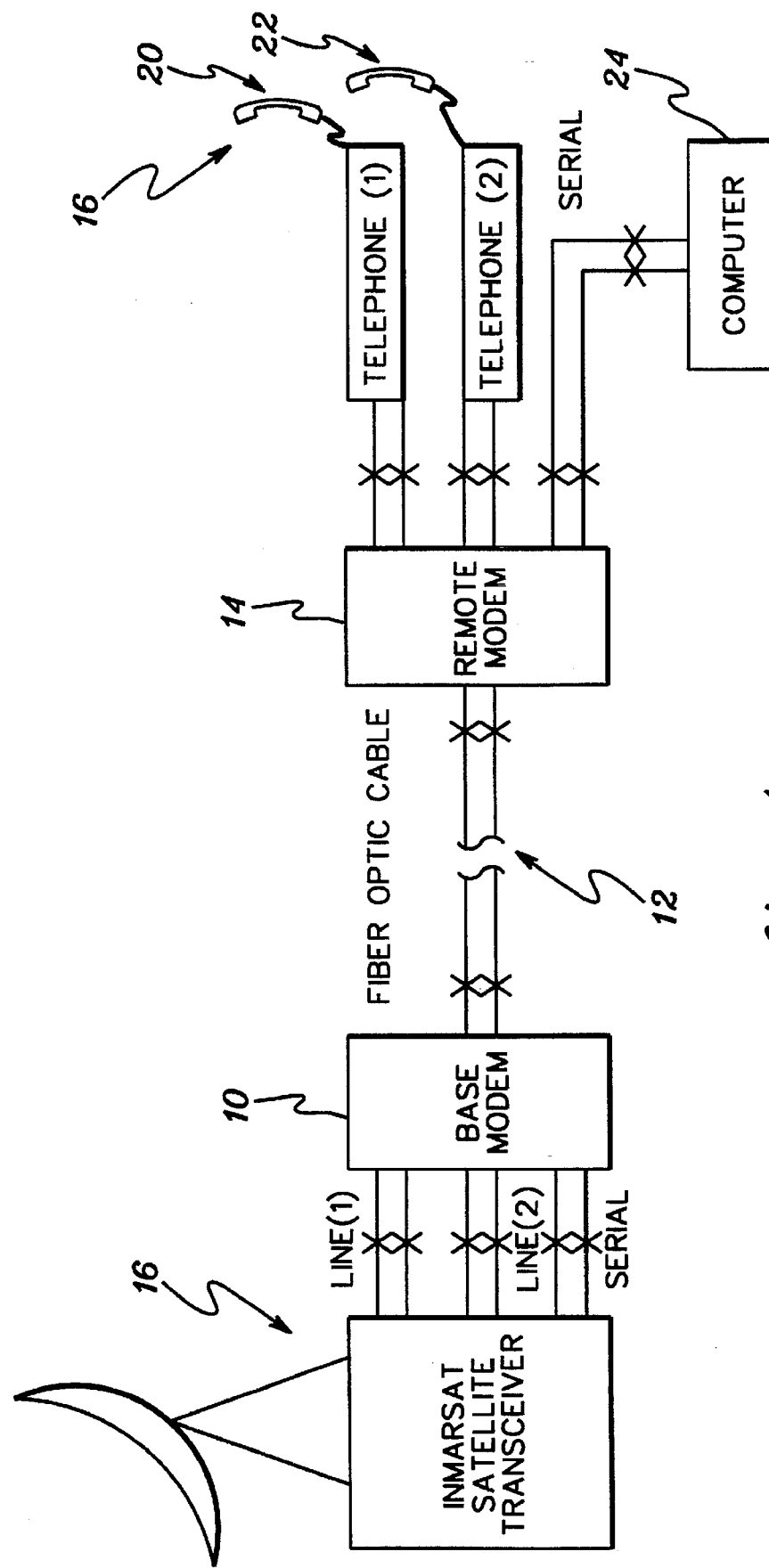
FIG. 1 illustrates an example of a system employing base and remote modems, and a fiber optic link in accordance with the present invention.

Apparatus constructed in accordance with the present invention, as depicted in FIG. 1, allows users to utilize an instrument at an extended distance from an interface to a communication network 16. More specifically, subscribers at a remote station 18 can utilize user instrument 20 to communicate with communication network 16 by employing fiber optic communication link 12. User instrument 20 can comprise any instrument currently capable of telephone communication including, but not limited to: standard telephone handsets; secure telephones; facsimile machines; and computer modems. In the preferred embodiment, a second user instrument 22 and a computer 24 are also employed at remote station 18. The fiber optic communication link 12 provides extended distance communication, up to 2.5 kilometers in the preferred embodiment, between the remote site 18 and the communication network 16. To facilitate communication over the link, a base modem 10 is provided and located proximate an interface of communication network 16, and in the preferred embodiment, near a control/interface panel (not shown) of a satellite transceiver. A remote modem 14 is also provided and located at remote station 18. Remote modem 14 accepts direct, standard inputs from user instruments, e.g. user instrument 20 or user instrument 22, and also supports serial data communication for computer 24.

In the preferred embodiment, three full-duplex, independent communication channels are provided between communication network 16 and remote station 18. Telephone communication channels are provided for two instruments and a third channel is provided for serial data communication. Base modem 10 and remote modem 14 provide transparency to the subscriber and the communication network. In other words, the modems and the fiber optic link are easily installed and used in existing systems so that no modification of existing equipment or operating procedures is necessary. This is accomplished by emulation and conversion circuitry in the modems provided in accordance with the present invention. Both modems accept and produce the standard signal levels, formats and protocols expected by the network or instruments and emulate to those equipments the functions of existing hardware, e.g. a telephone handset loop is emulated by the base modem. However, the modems additionally provide conversion of those levels, formats and protocols to modulated data suitable for transmission via the fiber optic link. Modulated data received from the fiber optic link is similarly converted back to levels, formats and protocols and provided to the network or instrument. The system provided therefore allows a user to exploit the advantages of fiber optic transmission including extended distance, noise immunity and security without making any modifications to existing hardware or procedures.

Figure 2:
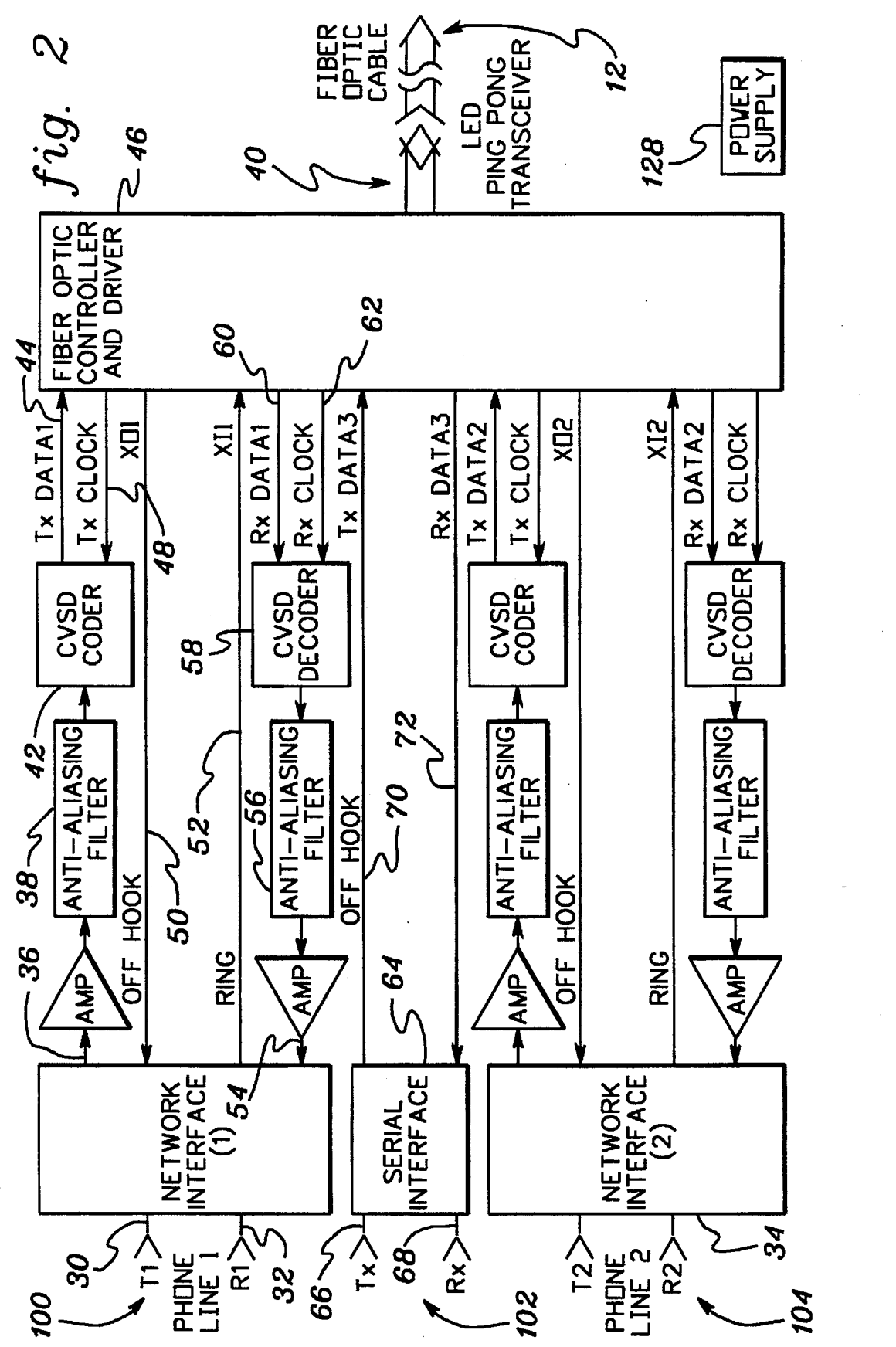

A schematic representation of the preferred embodiment of a base modem 10 is shown in FIG. 2. Three communication paths are shown, two-way communication paths 100 and 104, and two-way serial communication path 102. Path 100 and serial path 102 are discussed in detail as path 104 merely replicates the circuitry of path 100.

Network interface 34 is provided and accepts, from the communication network, the tip 30 and ring 32 signals. These signals, as is well known in the art, carry d.c. power, audio (including voice, dial tones, DTMF dialing, modulated facsimile transmissions and computer modem transmissions) between the network and instrument, signal a telephone ring and sense an off-hook condition. Network interface 34 provides an interface between separate receive and transmit signals, network audio signal 36 and network audio signal 54 respectively, and tip 30 and ring 32. A two to four-wire conversion is accomplished so that network audio signal 36 is provided to anti-aliasing filter 38, and network audio signal 54 is accepted from anti-aliasing filter 56. "Four-wire" merely denotes the fact that the AC-coupled audio signals 36 and 54 each use two wires, one of which is a ground (not shown). Separate audio transmit and receive paths are now therefore provided. Network interface 34 also provides a nominal telephone line input resistance (normally provided by a user instrument) of 600 ohms, a 22 kohm load for network audio signal 54, and a 50 ohm output impedance for network audio signal 36. The combined functions of the conversion, impedance matching and the ring/off-hook logic signals (discussed below) provide a complete emulation of a user instrument to the communication network.

One implementation of network interface 34 is the Data Access Arrangement (DAA) Stik, DS2249 from Dallas Semiconductor of Dallas, Tex. The DS2249 is designed to provide direct connection to a public switched telephone network through an appropriate connector such as an RJ-11. Included in the DS2249 is a ring detection output and a two to four-wire converter. Other equivalent network interface circuits may also be used.

Having divided the signal path into separate transmit and receive paths, i.e. network audio signal 36 and network audio signal 54, audio processing means is provided for processing the two paths and comprises generally anti-aliasing filter 38, CVSD coder 42, anti-aliasing filter 56 and CVSD decoder 58. In the preferred embodiment, an audio signal is filtered and converted, using continuously variable slope delta modulation, to a digital data stream for transmission across the fiber optic communication link 12. Other processing means are possible, employing other analog-digital conversion techniques, or analog heterodyne mixing.

Continuing in FIG. 2, anti-aliasing filter 38 performs a low pass filter function on network audio signal 36 to prevent distortion through aliasing in the CVSD coder 42. One specific suitable implementation of the anti-aliasing filter 38 is an LTC1062 5th order, zero DC error, low pass filter from Maxim Integrated Products of Sunnyvale, Calif. The cutoff frequency of the filter can be controlled by an external oscillator such as an XR-2209 precision oscillator from EXAR of San Jose, Calif. The cutoff frequency in the present implementation corresponds to the response normally associated with telephone communication, or approximately 3440 Hz. Those skilled in the art will recognize that other comparable components may be substituted for the specific implementation of the filter and associated oscillator.

Following the low pass filter, the network audio signal is applied to CVSD coder 42 which is a continuously variable slope delta modulator. A continuously variable slope delta (CVSD) modulator is a simple alternative to more complex conventional conversion techniques in systems requiring digital communication of analog signals. A delta modulator consists of a comparator in the forward path and an integrator in the feedback path of a simple control loop. The inputs to the comparator are the input analog signal and the integrator output. The comparator output reflects the sign of the difference between the input voltage and the integrator output. That sign bit is the digital output and also controls the direction of ramp in the integrator. The comparator is normally clocked so as to produce a synchronous and band limited digital bit stream. Clock 48, provided by fiber optic controller/driver 46, provides the necessary clock input at a rate of 64 kHz. The continuous, digital output signal 44 needs no additional synchronization or framing for transmission across link 12.

CVSD coder 42, in the preferred embodiment, provides increased dynamic range by adjusting the gain of the integrator. In addition to the basic delta modulator, a circuit is provided which monitors the past few outputs of the delta modulator in a simple shift register. The register in the preferred embodiment is four bits long. The circuit monitors the contents of the shift register thereby providing a measure of the average power of the input signal. The gain of the integrator is adjusted as a result of the measurement. The effect of the circuit is to command the input signal. (The circuit is repeated in the receiver to restore the level variations.)

One exemplary implementation of a suitable modulator that also implements the gain adjusting circuit is the MC3518 modulator/demodulator available from Motorola of Austin, Tex. In the preferred embodiment, the value of the resistance for loop gain selection is 1.3 kohm with input voltage of 5 V, and the minimum step size is 20 mv.

Modulated signal 44 is produced by CVSD coder 42 and fed to fiber optic controller/driver 46. Fiber optic controller/driver 46 is a synchronous modem capable of transmitting modulated signal 44 across fiber optic communication link 12 to remote modem 14 as shown in FIG. 1. As mentioned above, synchronization with the digital data source is maintained by providing the source, in this case CVSD coder 42, with clock 48. The 64 kHz modulated signal 44 is accepted and time division multiplexed with other channels of data, for instance, those from two-way serial communication path 102 and two-way communication path 104 in the preferred embodiment. At remote station 18, remote modem 14 contains a similar device and synchronization across the link is automatically maintained, including compensation for path delays. One specific implementation of fiber optic controller/driver 46 is the Acapella ACS103 optical modem IC available from Chesapeake Technology Group of Columbia, Md. Operated in its standard mode, this IC supports the six virtual 64 kHz channels in the preferred embodiment (transmit/receive for two instruments and transmit/receive for the serial interface). In addition, the device supports a full-duplex communication over a single strand fiber by employing LED transceiver 40 which includes a combined light emitting diode/detector. As discussed below, several auxiliary, low sample rate channels are utilized for receiving off-hook logic 50 and transmitting ring logic 52.

To complete two-way audio communication within path 100, modulated signal 60 is received by fiber optic controller/driver 46 from the remote modem 14 and fed to the audio processing means which employs CVSD decoder 58 and anti-aliasing filter 56 thus providing a receive channel complementing the transmit channel discussed above. CVSD decoder 58 in the preferred embodiment performs the inverse function of CVSD coder 42. The clocked bit stream is received, and delivered to a similar integrator and the integrator output is a copy of an analog signal produced by remote modem 14 at the remote station 18. Quantizing noise is removed by anti-aliasing filter 56, and the resultant network audio signal 54 is sent to the network by network interface 34.

In addition to implementing the audio paths associated with two-way communication path 100, the communication network 16 and user instrument 20 require additional, standard handshaking to operate. The ring and off-hook conditions must be communicated between the network and the instrument via the fiber optic network. A ring signal, generated by the network, usually consists of an analog tone at 20 Hz, 86 V rms. An instrument, in its on-hook, hence open-loop state, has a bridged ringer across the tip and ring lines which responds to the tone. In the preferred embodiment, this ring tone is sensed by network interface 34 and ring logic 52 is asserted in response. Ring logic 52 is fed to fiber optic controller/driver 46 and, using a low sampled rate channel, is similarly multiplexed and transmitted over fiber optic communication link 12 and received by remote modem 14.

Remote modem 14, upon sensing an off-hook condition at remote station 18, similarly asserts a logic line, which, upon transmission and reception, becomes asserted off-hook logic 50. Network interface 34, upon sensing this logic, seizes a telephone circuit within communication network 16 by closing a loop between tip 30 and ring 32. An open audio channel is now available for telephone communication. Having fully complied with all existing transmission and protocol requirements required by communication network 16, base modem 10, in effect, emulates an instrument to the network, while communicating with an instrument at a remote site via a fiber optic link.

In the preferred embodiment, two full-duplex audio paths, i.e. two-way communication paths 100 and 104, are provided, and an additional two-way serial communication path 102 is also supported. The third, full-duplex channel available over fiber optic communication link 12 is occupied by simple, full-duplex serial data stream. Serial interface 64 is provided in base modem 10 to support this path. Serial interface 64 includes an EIA-232-D receiver to level shift the voltage of transmit 66 in the range of −25 to +25 volts down to TTL/CMOS levels of 0−+5 volts, resulting in transmit 70. Similarly, a driver is included to level shift the TTL/CMOS voltage of receive 72 to EIA-232-D levels of ±5 to 15 volts for receive 68. One specific implementation of serial interface 64 is the MC145406 Driver/Receiver from Motorola. The two-way serial communication path 102 is therefore available for machine-machine communication over fiber optic communication link 12. An example of such communication is additional control/data required by a satellite transceiver at the base modem. Such information may be provided by a user at the remote site by utilizing this third channel. Full-duplex data rates up to 64 kbps are provided for the serial path in the preferred embodiment.

Figure 3A:
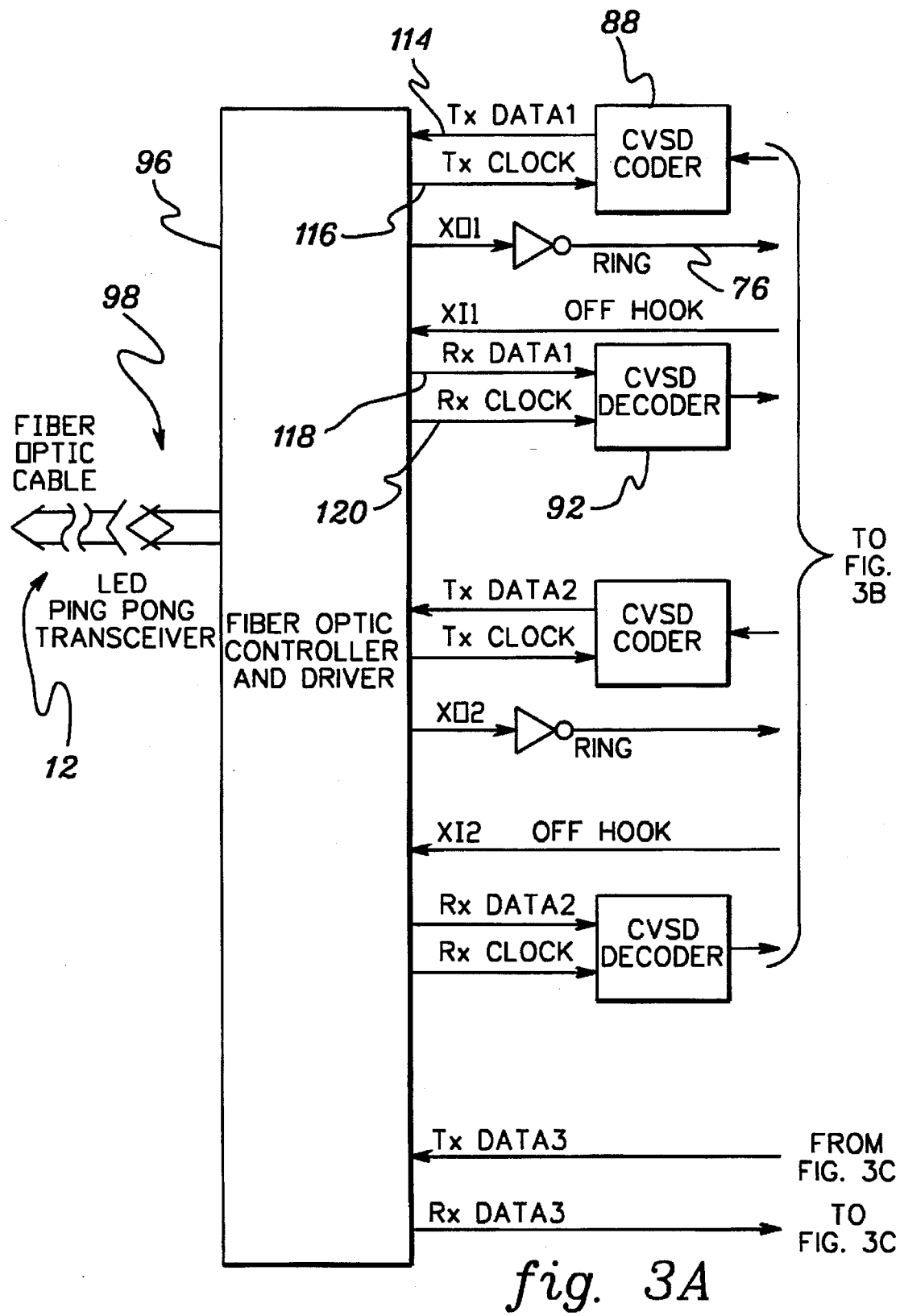
FIG. 3 is a schematic representation of a remote modem in accordance with the present invention.
Figure 3B:
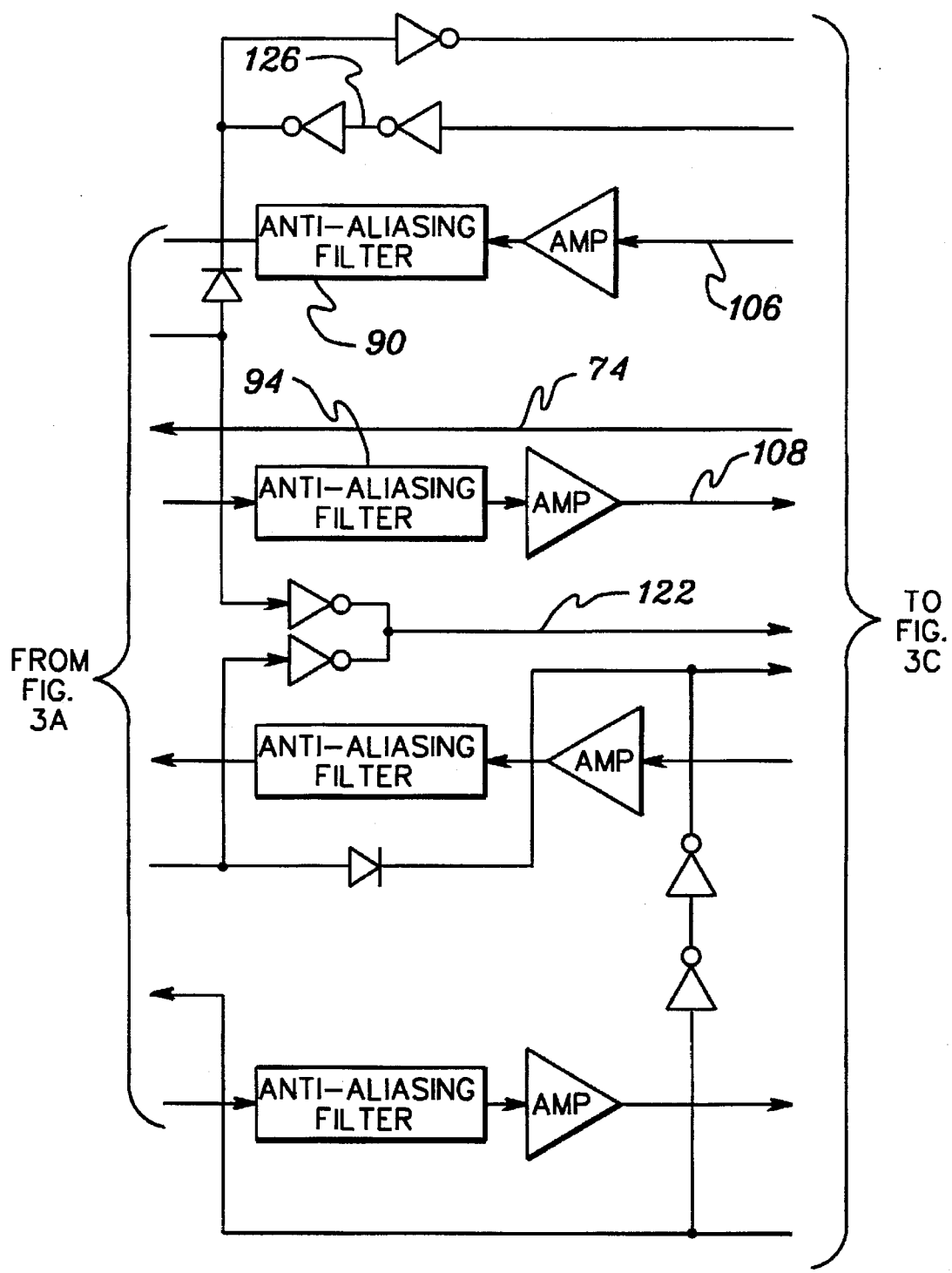
Figure 3C:
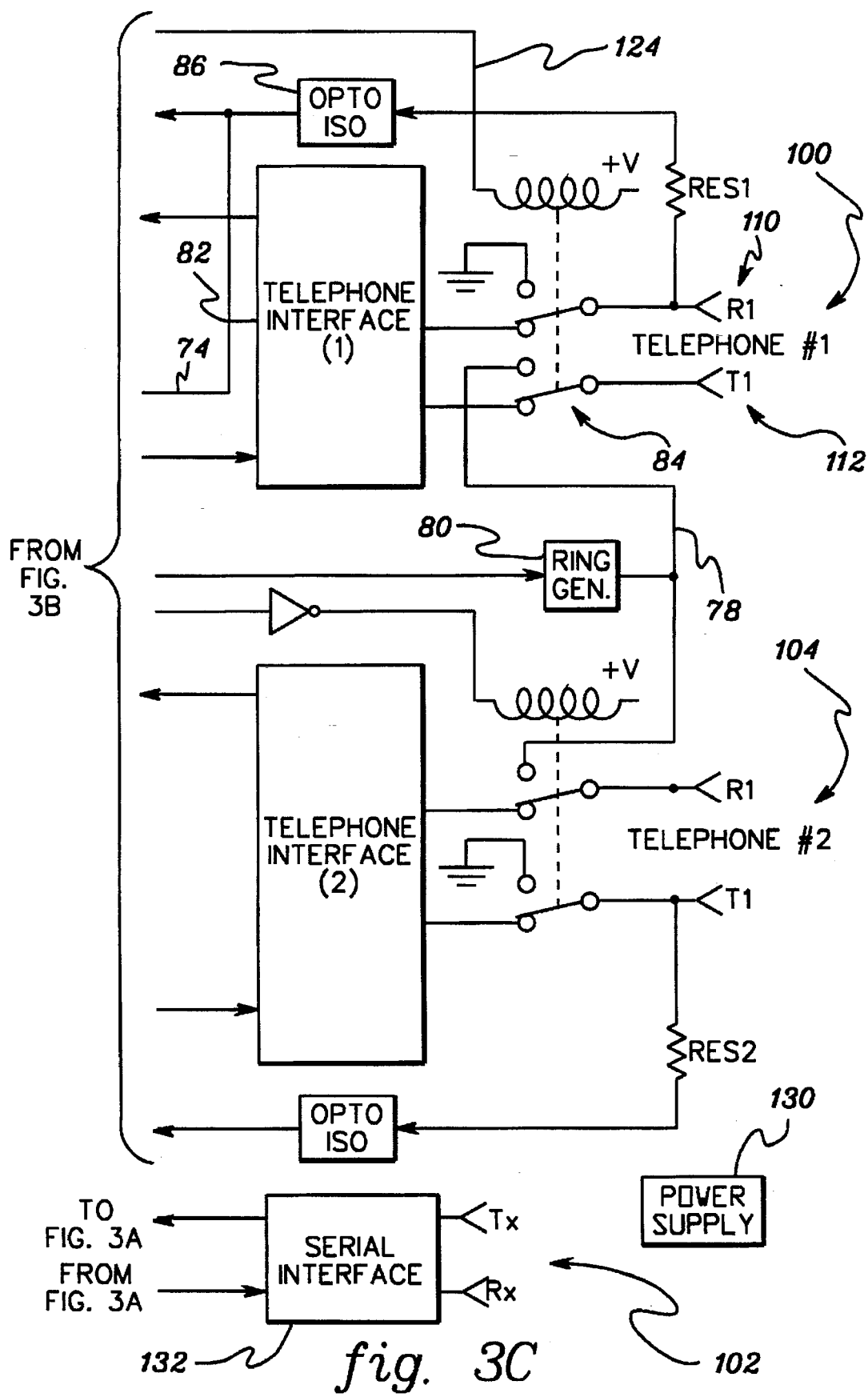

FIG. 3 is a schematic representation of the remote modem 14. The remote modem provides communication over fiber optic communication link 12 to a user at a remote site. The remote modem emulates a communication network to a user instrument at the remote site. This emulation is similar to the emulation of a user instrument to a communication network provided by the base modem as discussed above. The combined operation of the modems and the fiber optic communication link 12 therefore provides seamless, transparent telephone communication over the link. The differences in emulation required result in circuitry which distinguishes the remote modem from the base modem. As with the base modem, the circuitry comprising two-way communication path 100 is duplicated in two-way communication path 104 in the preferred embodiment and therefore, the discussion will be limited to path 100. One exception to this duplication, as will be discussed, is the ring generator 80 and the associated ring circuitry which is shared by both paths in the preferred embodiment for convenience.

Within remote modem 14, telephone interface 82 is provided to convert the two-wire instrument signal from ring 110 and tip 112 to a four-wire signal. Two-way communication path 100 is thereby divided into separate transmit and receive paths, i.e. user audio signal 106 and user audio signal 108, respectively. Telephone interface 82 performs the functions necessary to supervise signalling and audio transmission between the remote modem and the loop circuitry in the user instrument. The interface separates the directions of speech transmission and balances the two-wire line (ring 110 and tip 112) and provides proper impedance levels. The output user audio signal 106 requires a load of 20 kohm, and the input resistance for user audio signal 108 is 100 kohm. A user instrument's tip and ring lines nominally require a 300 kohm load which is provided along with a feed current, nominally 20–80 mA across the instrument's loop in an off-hook condition, and an effective balance of the tip and ring lines to eliminate noise. As is discussed below, the preferred embodiment provides ring signal 78 and includes associated circuitry to produce a ring in the user instrument responsive to ring logic 76. Optocoupler 86 is responsive to an off-hook condition from the user instrument by asserting off-hook logic 74. The combined functions of the conversion, impedance matching and the ring/off-hook logic signals (discussed below) provide a complete emulation of a communication network to a user instrument. One implementation of telephone interface 82 is the AMS2006-LP interface circuit available from Aptek Technologies of Deerfield Beach, Fla., which includes a thick-film hybrid and laser-trimmed resistors for balancing and impedance matching.

An off-hook condition is conventionally provided by a closed loop between the tip and ring lines in a user instrument. This condition occurs when answering an incoming call or placing an outgoing call. In either situation, audio communication is established with the central office (or other communication network). As described above, all audio communication is handled via telephone interface 82. However, the off-hook condition and ring signal are handled separately from the audio processing in the preferred embodiment. Optocoupler 86 and relay 84 are provided to process both outgoing (from the remote modem to the base modem) off-hook conditions and incoming ring conditions.

When placing a call, the handset of a user instrument is raised, thereby completing a current loop between ring 110 and tip 112. Optocoupler 86 is provided to sense the current on ring 110 using an infrared light emitting diode (LED). A return path (not shown) is provided to maintain the integrity of the current loop. A silicon NPN phototransistor in the optocoupler 86, responsive to the LED, forward biases resulting in off-hook logic 74. This logic is applied to the fiber optic controller/driver 96 for transmission to the base modem which produces the required off-hook closed loop in network interface 34.

Upon the assertion of ring logic 76, indicating an incoming call from the base modem, a ring is required in the user instrument. Ring logic 76, from fiber optic controller/driver 96, is fed to both relay 84 and ring generator 80. Ringing is accomplished by switching relay 84, thereby connecting ring 110 and tip 112 to ground and ring signal 78, respectively. Generator logic 122, also derived from ring logic 76, triggers the ring generator and a ring is produced in the user instrument by ring signal 78. Ring signal 78, as is known, is generally an 86 V rms tone at 20 Hz. Should the user then pick up, an off-hook condition is again established, and, as above, off-hook logic 74 is produced by optocoupler 86. An additional step is necessary, that is, the re-connection of ring 110 and tip 112 to telephone interface 82 via relay 84. Answer logic 126, also produced by optocoupler 86, deasserts relay logic 124 and causes the relay to switch back to telephone interface 82 so that full audio communication is established when answering a call. Those skilled in the art will recognize the logic levels required for the operation of ring logic 76, off-hook logic 74, relay 84 and ring generator 80. An example implementation of ring generator 80 is the Telephone Ringing Generator available from Cambridge Electronics of Massachusetts. As shown in FIG. 3, the preferred embodiment shares a single ring generator between two-way communication paths 100 and 104 for convenience.

The separate transmit path, i.e. user audio signal 106, is processed in an audio processing means which includes, in the preferred embodiment, anti-aliasing filter 90 and CVSD coder 88. The audio processing means also includes CVSD decoder 92 and anti-aliasing filter 94 for providing received user audio signal 108 to said telephone interface 82. This circuitry is identical to that described above in the context of the base modem and includes the interface to fiber optic controller/driver 96 via modulated signals 114 and 118 and clocks 116 and 120. Fiber optic controller/driver 96 is also implemented identically to its complement in the base modem. In other words, after an audio connection is established, conversion of the audio signals and transmission of the modulated signals is identical in the base and remote modems. The discussion above, relating to the FIG. 2 base modem audio processing applies equally for the remote modem of FIG. 3.

The discussion above relating to serial interface 64 in the base modem also applies equally to serial interface 132. The use of these interfaces in the base and remote modems provides two-way serial communication path 102 in addition to two-way communication paths 100 and 104 in the preferred embodiment.

Fiber optic link 12 is a single strand cable composed of a 62.5 micron glass strand in the preferred embodiment. The LED operates at a wavelength of 850 nanometers. The signal will propagate in several modes across the cable because of the thickness of the cable and the wavelength used, but the multi-modal dispersion loss is controlled by the use of a graded index of refraction in the strand. Because a single strand fiber is employed, LED transceivers 40 and 98 use combined light emitting diode/detector devices. One implementation of such an LED is the 1A212 available from ABB HAFO of San Diego, Calif.

Persons skilled in the art will recognize the power requirements of the various components employed in the preferred embodiment. Power supply 128 and power supply 130 are provided, generally for converting standard 110 VAC to the DC power levels necessary for the components of the modems. Persons skilled in the art will also recognize that conformance to FCC Part-68 is required when implementing the interfaces herein disclosed.

Installation of the modems and the associated fiber optic link in an operational setting is straightforward. Power is required at the communication network for the base modem and at the remote site for the receive modem. Connectors are chosen for the particular application, but will generally be standard, RJ-11 sockets for the telephone connections and DB-25 sockets for the data connections. The single strand fiber optic cable and its connectors on each modem are similarly standard and are chosen to support the operational environment. The physical dimensions of the modems are related to the components chosen for implementation. The size of the modems in the preferred embodiment is approximately 8×4×3 inches.

In the preferred embodiment the base modem is configured for installation directly into the satellite transceiver system discussed above, and derives its power, audio and serial data from dedicated connectors. The base modem replaces the user instrument in the transceiver panel and the instrument is moved to the remote site. Because of the emulation features of the modems, this replacement is transparent to the transceiver system. The remote modem is less customized and requires a standard power connection and RJ-11 or DB-25 connections for the user instruments/ data devices at the remote site.

While the invention has been described in detail herein in accordance with certain preferred embodiments thereof, many modifications and changes therein may be affected by those skilled in the art. Accordingly, it is intended by the following claims to cover all such modifications and changes as fall within the true spirit and scope of the invention.

What is claimed is:

1. An apparatus for providing telephone communication between a communication network and a remote station, said apparatus comprising:

a base modem for communicative connection to said communication network;

a remote modem for direct communicative connection to a first user instrument at said remote station; and a fiber optic link connecting said base modem to said remote modem such that telephone communication between said communication network and said first user instrument is provided via said fiber optic link, said fiber optic link being transparent to said communication network and said first user instrument;

wherein said remote modem provides a first two-way communication path between said first user instrument and the fiber optic link, said remote modem including:

a first telephone interface for direct communicative connection to said first user instrument and for emulating the communication network to said first user instrument;

a fiber optic controller/driver for transmitting and receiving digitally modulated signals over said fiber optic link;

first audio processing means connected between said first telephone interface and said fiber optic controller/ driver such that a first audio signal received from said first user instrument by said first telephone interface is converted to a first digitally modulated signal by modulation means in said first audio processing means and transmitted to said fiber optic link by said fiber optic controller/driver, and a second digitally modulated signal received from said fiber optic link by said fiber optic controller/driver is converted to a second user audio signal by demodulation means in said first audio processing means and transmitted to said first user instrument by said first telephone interface, the modulation means and demodulation means each receiving clock signals from said fiber optic controller/driver;

separate paths within said first two-way communication path for a ring logic and an off-hook logic wherein said fiber optic controller/driver facilitates the transmission of said ring and off-hook logic in separate digital channels over the fiber optic link;

a ring generator for generating a ring signal to said first user instrument;

a relay for connecting said first user instrument to either said first telephone interface or said ring generator; and a ring circuit for responding to the ring logic from said fiber optic controller/driver by causing the relay to connect the first user instrument to said ring generator, and responding to an off-hook condition received from said first user instrument by causing the relay to connect the first user instrument to the first telephone interface and causing the off-hook logic to be transmitted to said fiber optic controller/driver.

2. The apparatus of claim 1 wherein said base modem includes:

means for converting a first network audio signal from said communication network to digital data for transmission via said fiber optic communication link; and means for converting digital data received from said fiber optic communication link to a second network audio signal for transmission to said communication network.

3. The apparatus of claim 2 wherein said base modem includes network interface means for emulating said first user instrument to said communication network.

4. The apparatus of claim 3 wherein the base modem includes means for transmitting a ring signal received from said communication network across said fiber optic communication link via the ring logic.

5. The apparatus of claim 4 wherein said base modem and said remote modem each include a serial interface for supporting a serial data communication path via said fiber optic communication link.

6. The apparatus of claim 5 wherein the communication network includes a communication terminal and wherein terminal control information is transmitted via the serial data communication path.

7. The apparatus of claim 4 wherein said fiber optic communication link is at least 500 feet long.

8. The apparatus of claim 1 wherein said base modem provides a first two-way communication path between said communication network and the fiber optic link, said base modem comprising:

a first network interface for communicative connection to said communication network and for emulating the first user instrument to said communication network;

a fiber optic controller/driver for transmitting and receiving modulated signals and the ring and off-hook logic over said fiber optic link; and first audio processing means connected between said first network interface and said fiber optic controller/driver of the base modem such that a first network audio signal received from said communication network by said first network interface is converted to the second modulated signal by said first audio processing means of the base modem and transmitted to said fiber optic link by said fiber optic controller/driver of the base modem, and the first modulated signal received from said fiber optic link by said fiber optic controller/driver is converted to a second network audio signal by said first audio processing means of the base modem and transmitted to said communication network by said first network interface.

9. The apparatus of claim 8 wherein the base modem further comprises serial data interface means connected to said fiber optic controller/driver of the base modem for providing a serial data communication path between an external device and said fiber optic link.

10. The apparatus of claim 9 wherein the communication network includes a communication terminal and wherein terminal control information is transmitted via the serial data communication path.

11. The apparatus of claim 8 wherein said first audio processing means of the base modem comprises:

continuously variable slope delta modulation means for converting said first network audio signal to said second modulated signal; and continuously variable slope delta demodulation means for converting said first modulated signal to said second network audio signal.

12. The apparatus of claim 11 wherein:

said modulation means and demodulation means of the base modem each receive clock signals from said fiber optic controller/driver of the base modem;

said base modem further comprises a first filter, connected to said modulation means of the base modem, for bandlimiting said first network audio signal prior to conversion to said second modulated signal;

said base modem further comprises a second filter, connected to said demodulation means of the base modem, for bandlimiting said second network audio signal subsequent to conversion from said first modulated signal;

said first two-way communication path of the base modem includes separate paths for the ring logic and the off-hook logic and wherein said fiber optic controller/driver of the base modem facilitates the transmission of said ring and off-hook logic in the separate digital channels over the fiber optic link;

said first network interface of the base modem further comprises circuitry for responding to the off-hook logic received from said fiber optic controller/driver of the base modem by signalling an off-hook condition to said communication network, circuitry for responding to a ring signal received from said communication network by providing said ring logic to said fiber optic controller/driver of the base modem; and said fiber optic controller/driver of the base modem includes a combined light emitting diode/detector for providing full-duplex communication over the fiber optic link.

13. The apparatus of claim 8 wherein said base modem further comprises:

a first filter, connected to said first audio processing means of the base modem, for bandlimiting said first network audio signal prior to conversion to said second modulated signal; and a second filter, connected to said first audio processing means of the base modem, for bandlimiting said second network audio signal subsequent to conversion from said first modulated signal.

14. The apparatus of claim 8 wherein said first two-way communication path of the base modem includes separate paths for the ring logic and the off-hook logic and wherein said fiber optic controller/driver of the base modem facilitates the transmission of said ring and off-hook logic in the separate digital channels over the fiber optic link.

15. The apparatus of claim 14 wherein said first network interface of the base modem further comprises:

circuitry for responding to the off-hook logic received from said fiber optic controller/driver of the base modem by signalling an off-hook condition to said communication network; and circuitry for responding to a ring signal received from said communication network by providing said ring logic to said fiber optic controller/driver of the base modem.

16. The apparatus of claim 8 wherein said first network interface of the base modem comprises an interface from two-wire to four-wire audio signals.

17. The apparatus of claim 8 wherein said fiber optic controller/driver of the base modem includes a combined light emitting diode/detector for providing full-duplex communication over the fiber optic link.

18. The apparatus of claim 8 wherein the base modem provides a second two-way communication path between the communication network and the fiber optic link, the base modem further comprising:

a second network interface for communicative connection to said communication network and for emulating a second user instrument to said communication network; and second audio processing means connected between said second network interface and said fiber optic controller/driver of the base modem such that a third network audio signal received from said communication network by said second network interface is converted to a third modulated signal by said second audio processing means and transmitted to said fiber optic link by said fiber optic controller/driver of the base modem, and a fourth modulated signal received from said fiber optic link by said fiber optic controller/driver of the base modem is converted to a fourth network audio signal by said second audio processing means and transmitted to said communication network by said second network interface.

19. The apparatus of claim 18 wherein the first and second two-way communication paths of the base modem each include separate paths for a respective ring logic and a respective off-hook logic and wherein said fiber optic controller/driver of the base modem facilitates the transmission of the respective ring logic signals and the respective off-hook logic signals in respective separate digital channels over the fiber optic link.

20. The apparatus of claim 1 wherein telephone communication is provided via the fiber optic link for a second user instrument and wherein a digital off-hook channel is provided over the fiber optic link for each of the first and second user instruments.

21. The apparatus of claim 20 wherein a digital instrument ring channel is provided over the fiber optic link for each of the first and second user instruments.

22. The apparatus of claim 1 wherein said base modem provides a first two-way communication path between said communication network and the fiber optic link, said base modem comprising:

a fiber optic controller/driver for transmitting and receiving modulated signals and the ring and off-hook logic over said fiber optic link;

a first network interface for communicative connection to said communication network and for emulating the first user instrument to said communication network, said first network interface further including:

circuitry for responding to the off-hook logic received from said fiber optic controller/driver of the base modem by signalling an off-hook condition to said communication network, and circuitry for responding to a ring signal received from said communication network by providing the ring logic to said fiber optic controller/driver of the base modem;

first audio processing means connected between said first network interface and said fiber optic controller/driver of the base modem such that a first network audio signal received from said communication network by said first network interface is converted to the second modulated signal by modulation means in said first audio processing means of the base modem and transmitted to said fiber optic controller/driver of the base modem, and the first modulated signal received from said fiber optic link by said fiber optic controller/driver of the base modem is converted to a second network audio signal by demodulation means in said first audio processing means of the base modem and transmitted to said communication network by said first network interface, the modulation means and demodulation means of the base modem each receiving clock signals from said fiber optic controller/driver of the base modem;

wherein said first two-way communication path of the base modem includes separate paths for the ring logic and the off-hook logic and wherein said fiber optic controller/driver of the base modem facilitates the transmission of said ring and off-hook logic in the separate digital channels over the fiber optic link.

23. The apparatus of claim 1, wherein the ring circuit of the remote modem comprises:

a first path to carry the ring logic from the fiber optic controller/driver to the relay to thereby connect the first user instrument to the ring generator;

a second path from the first user instrument to the relay through a node in the first path to carry the off-hook logic to the relay to thereby disconnect the first user instrument from the ring generator during the off-hook condition; and a third path between a node in the second path and the fiber optic controller/driver to transmit the off-hook logic to the fiber optic controller/driver.

24. The apparatus of claim 23, wherein the ring circuit of the remote modem further comprises:

a diode coupled between the fiber optic controller/driver and the node of the first path to prevent the off-hook logic carried through the node of the first path from reaching the fiber optic controller/driver through the first path; and an optocoupler in the second path coupled between the first user instrument and the node in the second path to maintain integrity of a current loop in the first user instrument.

25. A remote modem for use with a first user instrument, said remote modem providing a first two-way communication path between said first user instrument and a fiber optic link, said remote modem comprising:

a first telephone interface for direct communicative connection to said first user instrument and for emulating communication network to said first user instrument;

a fiber optic controller/driver for transmitting and receiving modulated signals over a single fiber optic strand of said fiber optic link;

first audio processing means connected between said first telephone interface and said fiber optic controller/driver such that a first user audio signal received from said first user instrument by said first telephone interface is converted to a first modulated signal by modulation means in said first audio processing means and transmitted to said fiber optic link by said fiber optic controller/driver, said first modulated signal comprising a first digital data stream, and a second modulated signal comprising a second digital data stream and received from said fiber optic link by said fiber optic controller/driver is converted to a second user audio signal by demodulation means in said first audio processing means and transmitted to said first user instrument by said first telephone interface; and wherein:

said modulation means and demodulation means each receive clock signals from said fiber optic controller/driver;

said remote modem further comprises a first filter, connected to said modulation means, for bandlimiting said first user audio signal prior to conversion to said second modulated signal;

said remote modem further comprises a second filter, connected to said demodulation means, for bandlimiting said second user audio signal subsequent to conversion from said first modulated signal;

said first two-way communication path includes separate paths for a ring logic and an off-hook logic and wherein said fiber optic controller/driver facilitates the transmission of said ring and off-hook logic in separate digital channels over the single fiber optic strand;

said remote modem further comprises a ring generator for generating a ring signal to said first user instrument;

said remote modem further comprises a relay for connecting said first user instrument to either said first telephone interface or said ring generator;

said remote modem further comprises a ring circuit for responding to a ring logic from said fiber optic controller/driver by causing the relay to connect the first user instrument to said ring generator, and responding to an off-hook condition received from said first user instrument by causing the relay to connect the first user instrument to the first telephone interface and causing an off-hook logic to be transmitted to said fiber optic controller/driver; and said fiber optic controller/driver includes a combined light emitting diode/detector for providing full-duplex communication over the single fiber optic strand.

26. The remote modem of claim 25, wherein the ring circuit comprises:

a first path to carry the ring logic from the fiber optic controller/driver to the relay to thereby connect the first user instrument to the ring generator;

a second path from the first user instrument to the relay through a node in the first path to carry the off-hook logic to the relay to thereby disconnect the first user instrument from the ring generator during the off-hook condition; and a third path between a node in the second path and the fiber optic controller/driver to transmit the off-hook logic to the fiber optic controller/driver.

27. The remote modem of claim 26, wherein the ring circuit further comprises:

a diode coupled between the fiber optic controller/driver and the node of the first path to prevent the off-hook logic carried through the node of the first path from reaching the fiber optic controller/driver through the first path; and an optocoupler in the second path coupled between the first user instrument and the node in the second path to maintain integrity of a current loop in the first user instrument.

28. A remote modem for use with first and second user instruments, said remote modem providing a first two-way communication path between said first user instrument and a fiber optic link, said remote modem providing a second two-way communication path between said second user instrument and the fiber optic link, said remote modem comprising:

a first telephone interface for direct communicative connection to said first user instrument and for emulating a communication network to the first user instrument;

a second telephone interface for direct communicative connection to said second user instrument and for emulating the communication network to the second user instrument;

a fiber optic controller/driver for transmitting and receiving modulated signals over a single fiber optic strand of said fiber optic link, said first and second two-way communication paths each including separate paths for a ring logic signal and an off-hook logic signal and wherein said fiber optic controller/driver facilitates the transmission of the ring logic signals and said off-hook logic signals in separate digital channels over the single fiber optic strand;

first audio processing means connected between said first telephone interface and said fiber optic controller/driver such that a first user audio signal received from said first user instrument by said first telephone interface is converted to a first modulated signal by said first audio processing means and transmitted to said fiber optic link by said fiber optic controller/driver, said first modulated signal comprising a first digital data stream, and a second modulated signal comprising a second digital data stream received from said fiber optic link by said fiber optic controller/driver is converted to a second user audio signal by said first audio processing means and transmitted to said first user instrument by said first telephone interface;

second audio processing means connected between said second telephone interface and said fiber optic controller/driver such that a third user audio signal received from said second user instrument by said second telephone interface is converted to a third modulated signal by said second audio processing means and transmitted to said fiber optic link by said fiber optic controller/driver, and a fourth modulated signal received from said fiber optic link by said fiber optic controller/driver is converted to a fourth user audio signal by said second audio processing means and transmitted to said second user instrument by said second telephone interface;

a shared ring generator for providing a ring signal to both the first and second user instruments in response to the respective ring logic signals;

first and second relays for connecting each user instrument to either its respective telephone interface or said shared ring generator; and first and second ring circuits for responding to a respective ring logic signal from said fiber optic controller/driver by causing the respective relay to connect the respective user instrument to the shared ring generator.

29. A remote modem for use with a first user instrument, said remote modem providing a first two-way communication path between said first user instrument and a fiber optic link, said remote modem comprising:

a first telephone interface for direct communicative connection to said first user instrument and for emulating a communication network to said first user instrument;

a fiber optic controller/driver for transmitting and receiving digitally modulated signals over said fiber optic link;

first audio processing means connected between said first telephone interface and said fiber optic controller/driver such that a first audio signal received from said first user instrument by said first telephone interface is converted to a first digitally modulated signal by modulation means in said first audio processing means and transmitted to said fiber optic link by said fiber optic controller/driver, and a second digitally modulated signal received from said fiber optic link by said fiber optic controller/driver is converted to a second user audio signal by demodulation means in said first audio processing means and transmitted to said first user instrument by said first telephone interface, the modulation means and demodulation means each receiving clock signals from said fiber optic controller/driver;

separate paths within said first two-way communication path for a ring logic and an off-hook logic wherein said fiber optic controller/driver facilitates the transmission of said ring and off-hook logic in separate digital channels over the fiber optic link;

a ring generator for generating a ring signal to said first user instrument;

a relay for connecting said first user instrument to either said first telephone interface or said ring generator; and a ring circuit for
responding to the ring logic from said fiber optic controller/driver by causing the relay to connect the first user instrument to said ring generator, and
responding to an off-hook condition received from said first user instrument by causing the relay to connect the first user instrument to the first telephone interface and causing the off-hook logic to be transmitted to said fiber optic controller/driver.

30. The remote modem of claim 29 further comprising serial data interface means connected to said fiber optic controller/driver for providing a serial data communication path between an external device and said fiber optic link.

31. The remote modem of claim 29 further comprising:
a first filter, connected to said first audio processing means, for bandlimiting said first user audio signal prior to conversion to said first modulated signal; and
a second filter, connected to said first audio processing means, for bandlimiting said second user audio signal subsequent to conversion from said second modulated signal.

32. The remote modem of claim 29 wherein said first telephone interface comprises an interface from two-wire to four-wire audio signals.

33. The remote modem of claim 29 wherein said fiber optic controller/driver includes a combined light emitting diode/detector for providing full-duplex communication over the fiber optic link.

34. The remote modem of claim 29 wherein the communication network includes a communication terminal and wherein terminal control information is transmitted via the serial data communication path.

35. The remote modem of claim 29 wherein the remote modem provides a second two-way communication path between a second user instrument and the fiber optic link, and wherein the ring generator is shared between the first and second user instruments.

36. The remote modem of claim 29, wherein the ring circuit comprises:
a first path to carry the ring logic from the fiber optic controller/driver to the relay to thereby connect the first user instrument to the ring generator;
a second path from the first user instrument to the relay through a node in the first path to carry the off-hook logic to the relay to thereby disconnect the first user instrument from the ring generator during the off-hook condition; and
a third path between a node in the second path and the fiber optic controller/driver to transmit the off-hook logic to the fiber optic controller/driver.

37. The remote modem of claim 36 wherein the ring circuit further comprises:
a diode coupled between the fiber optic controller/driver and the node of the first path to prevent the off-hook logic carried through the node of the first path from reaching the fiber optic controller/driver through the first path; and
an optocoupler in the second path coupled between the first user instrument and the node in the second path to maintain integrity of a current loop in the first user instrument.

* * * * *